United States Patent
Pettiross et al.

(10) Patent No.: US 7,478,339 B2
(45) Date of Patent: Jan. 13, 2009

(54) METHOD AND APPARATUS FOR APPLICATION WINDOW GROUPING AND MANAGEMENT

(75) Inventors: Jeffrey W. Pettiross, Seattle, WA (US); Sarah E. Schrock, Bellevue, WA (US); Charles W. Stabb, Seattle, WA (US); Donald J. Lindsay, Mountain View, CA (US); Cornelis K. Van Dok, Bellevue, WA (US); Hillel N. Cooperman, Sammamish, WA (US); Charles Cummins, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 620 days.

(21) Appl. No.: 11/095,616

(22) Filed: Apr. 1, 2005

(65) Prior Publication Data

US 2006/0224989 A1 Oct. 5, 2006

(51) Int. Cl.
*G06F 3/048* (2006.01)
(52) U.S. Cl. .................................... 715/779
(58) Field of Classification Search .............. 715/755, 715/788, 789, 775, 779, 783
See application file for complete search history.

(56) References Cited

U.S. PATENT DOCUMENTS

| | | | | |
|---|---|---|---|---|
| 5,757,371 A * | 5/1998 | Oran et al. | | 715/779 |
| 6,088,032 A | 7/2000 | Mackinlay | | |
| 6,710,788 B1 * | 3/2004 | Freach et al. | | 715/778 |
| 6,957,395 B1 * | 10/2005 | Jobs et al. | | 715/765 |
| 2003/0179240 A1 * | 9/2003 | Gest | | 345/779 |

* cited by examiner

*Primary Examiner*—Thanh T Vu
(74) *Attorney, Agent, or Firm*—Shook, Hardy & Bacon L.L.P.

(57) ABSTRACT

A method for managing a plurality of application window representations is described. The method includes steps of defining a set of application window representation positions in a predefined region, displaying a plurality of application window representations in the application window representation positions, receiving an input to open a first application window, creating a first application window representation in the predefined region, determining whether a second application window representation of the plurality needs to be repositioned into a hidden application window representation position, and repositioning the second application window representation into the hidden application window representation upon determining that the second application window representation needs to be repositioned, wherein the hidden application window representation position is within a glom.

20 Claims, 15 Drawing Sheets

METHOD AND APPARATUS FOR APPLICATION WINDOW GROUPING AND MANAGEMENT

FIELD OF THE INVENTION

Aspects of the present invention are directed generally to application window graphical interfaces in an operating system. More particularly, aspects of the present invention are directed to a method and system for grouping multiple application window representations in an operating system and allowing some intelligent behavior to exist between the application window representations.

BACKGROUND OF THE INVENTION

As the use of computers in both the workforce and personal life has increased, so has the desire to allow for easier use of them. Many operating systems today utilize a windows based configuration of application programs. Information is displayed on a display screen in what appears to be several sheets of paper. By interfacing with the windows, a user can access any window as if grabbing a single sheet of paper. A windows based configuration allows a user to have two or more windows open on a display screen simultaneously.

Application windows are a user interface facility of all graphical user interface (GUI) systems. While application windows may vary in appearance across systems, they share many common attributes such as the ability to be resized and repositioned and to exist among other application windows associated with different applications. In many GUI systems, a representation exists for each of the open application windows in a predefined area, such as a taskbar. The representation is a reference guide that can be used by a user to quickly locate a particular application window and/or access a particular application window.

A user interaction scenario common to modern GUIs involves multiple simultaneous open application windows that share a common screen real estate. Support for multiple simultaneous open application windows is part of the appeal and power of a modern GUI, but this frequently results in application windows overlapping and obscuring each other making it difficult for the user to locate or navigate to a specific application window. This type of scenario and associated solutions are commonly referred to as window management problems and solutions.

Users typically associate an application window with a task, such as email, and can further create mental associations between multiple application windows and a single task or project. For example, in order to produce a slide show presentation, a user may require content from three or four different application windows, possibly from one or more applications, such as email, a graphics application, and a spreadsheet application. Multiple application windows may be visible on a screen and each application window may be associated with one or more tasks. A user must locate and navigate between these disparate application windows in order to access or exchange content to complete the task.

There is a common window management solution in many GUIs whereby an application window can be minimized and removed from view in the primary working screen space. A minimized application window is typically represented by a significantly smaller UI element. In Windows XP by Microsoft® Corporation of Redmond, Wash., minimized application windows are represented as application window tiles on a control bar, such as the taskbar control. In Mac OS X by Apple Computer, Inc. of Cupertino, Calif., minimized application windows are represented as miniature thumbnail buttons in the Dock. Minimizing application windows allows the user to remove unneeded application windows from the screen space, allowing them to focus on a smaller set of application windows. However, when attempting to retrieve an application window by accessing its representation from a taskbar region, needed representations often get buried in gloms when less important representations are visible to the user.

SUMMARY OF THE INVENTION

There exists a need for the ability to provide a window management system to aid in managing multiple application window representations within a predefined region of a display screen. Aspects of the invention provide a new method for managing a plurality of application window representations. The method includes steps of defining a set of application window representation positions in a predefined region and displaying a plurality of application window representations in the application window representation positions. Upon receiving an input to open a first application window, the method creates a first application window representation in the predefined region, determines whether a second application window representation of the plurality of window representations needs to be repositioned into a hidden application window representation position, and repositions the second application window representation into the hidden application window representation upon determining that the second application window representation needs to be repositioned, wherein the hidden application window representation position is within a glom.

Another aspect of the present invention provides a method for displaying a notification associated with an application window. The method includes steps of displaying a first application widow representation in a visible application window representation position within a predefined region of a display screen and maintaining a second application window representation within a hidden application window representation position, the hidden application window representation position within a glom being associated with the first window application representation. The method also includes steps of receiving a notification associated with the second application window, and repositioning the second application window representation from the hidden application window representation position to a second visible application window representation position within the predefined region of the display screen.

BRIEF DESCRIPTION OF THE DRAWINGS

The foregoing summary of the invention, as well as the following detailed description of illustrative embodiments, is better understood when read in conjunction with the accompanying drawings, which are included by way of example, and not by way of limitation with regard to the claimed invention.

DETAILED DESCRIPTION OF ILLUSTRATIVE EMBODIMENTS

In the following description of various illustrative embodiments, reference is made to the accompanying drawings, which form a part hereof, and in which is shown, by way of illustration, various embodiments in which the invention may be practiced. It is to be understood that other embodiments may be utilized and structural and functional modifications may be made without departing from the scope of the present invention.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing system environment 100 be interpreted as having any dependency nor requirement relating to any one or combination of components illustrated in the exemplary computing system environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Figure 1A:
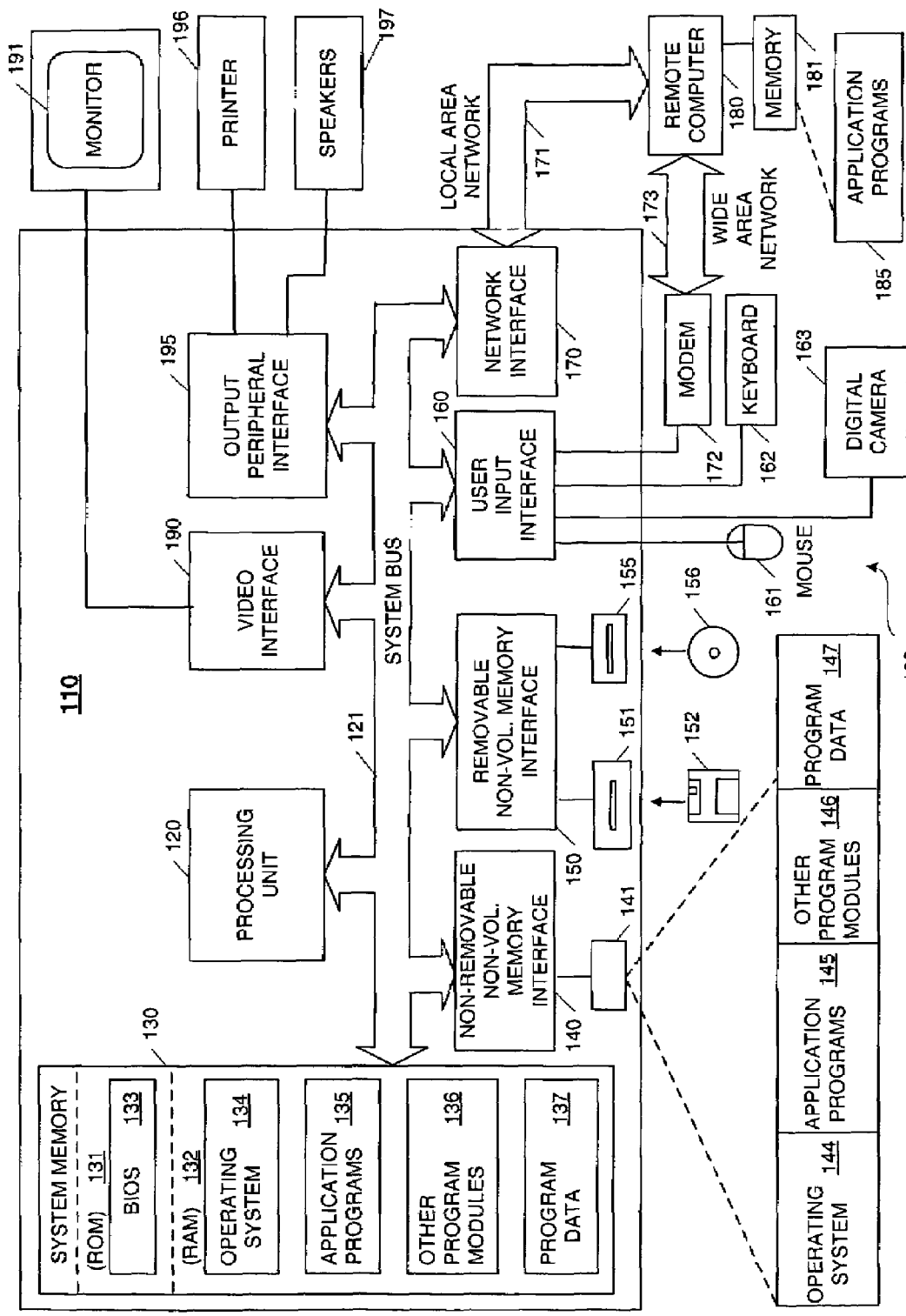
FIG. 1A illustrates a schematic diagram of a general-purpose digital computing environment in which certain aspects of the present invention may be implemented.

With reference to FIG. 1A, an exemplary system for implementing the invention includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, random access memory (RAM), read only memory (ROM), electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as ROM 131 and RAM 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1A illustrates operating system 134, application programs 135, other program modules 136, and program data 137.

The computer 110 may also include other removable/non-removable, volatile/nonvolatile computer storage media. By way of example only, FIG. 1A illustrates a hard disk drive 141 that reads from or writes to non-removable, nonvolatile magnetic media, a magnetic disk drive 151 that reads from or writes to a removable, nonvolatile magnetic disk 152, and an optical disc drive 155 that reads from or writes to a removable, nonvolatile optical disc 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus. 121 through a non-removable memory interface such as interface 140, and magnetic disk drive 151 and optical disc drive 155 are typically connected to the system bus 121 by a removable memory interface, such as interface 150.

The drives and their associated computer storage media discussed above and illustrated in FIG. 1A, provide storage of computer readable instructions, data structures, program modules and other data for the computer 110. In FIG. 1A, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a digital camera 163, a keyboard 162, and pointing device 161, commonly referred to as a mouse, trackball or touch pad. Other input devices (not shown) may include a pen, stylus and tablet, microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1A. The logical connections depicted in FIG. 1A include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1A illustrates remote application programs 185 as residing on memory device 181. It will be appreciated that the network connections shown are exemplary and other means of establishing a communications link between the computers may be used.

It will be appreciated that the network connections shown are exemplary and other means of establishing a communications link between the computers can be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

A programming interface (or more simply, interface) may be viewed as any mechanism, process, protocol for enabling one or more segment(s) of code to communicate with or access the functionality provided by one or more other segment(s) of code. Alternatively, a programming interface may be viewed as one or more mechanism(s), method(s), function call(s), module(s), object(s), etc. of a component of a system capable of communicative coupling to one or more mechanism(s), method(s), function call(s), module(s), etc. of other component(s). The term "segment of code" in the preceding sentence is intended to include one or more instructions or lines of code, and includes, e.g., code modules, objects, subroutines, functions, and so on, regardless of the terminology applied or whether the code segments are separately compiled, or whether the code segments are provided as source, intermediate, or object code, whether the code segments are utilized in a runtime system or process, or whether they are located on the same or different machines or distributed across multiple machines, or whether the functionality represented by the segments of code are implemented wholly in software, wholly in hardware, or a combination of hardware and software.

Figure 1C:
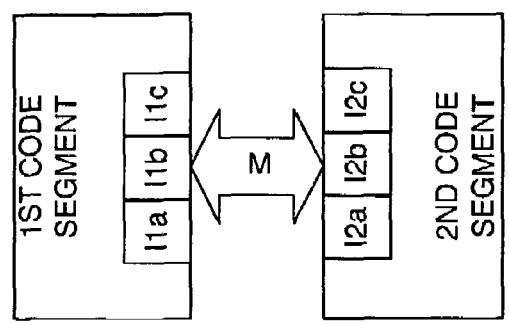
FIGS. 1B through 1M show a general-purpose computer environment supporting one or more aspects of the present invention.
Figure 1E:
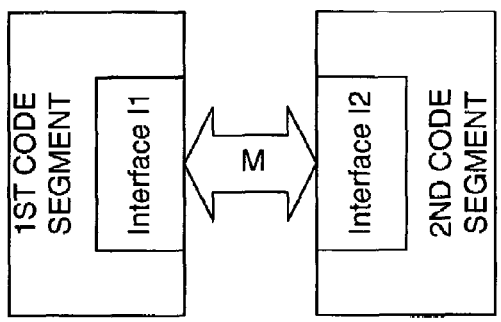
Figure 1B:
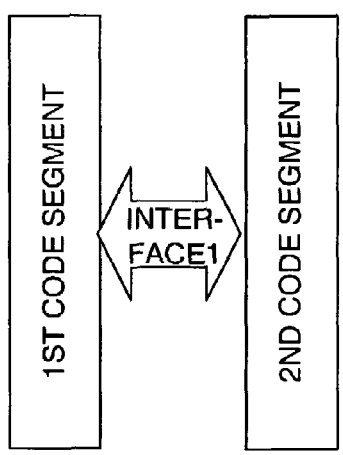

Notionally, a programming interface may be viewed generically, as shown in FIG. 1B or FIG. 1C. FIG. 1B illustrates an interface Interface1 as a conduit through which first and second code segments communicate. FIG. 1C illustrates an interface as comprising interface objects I1 and I2 (which may or may not be part of the first and second code segments), which enable first and second code segments of a system to communicate via medium M. In the view of FIG. 1C, one may consider interface objects I1 and I2 as separate interfaces of the same system and one may also consider that objects I1 and I2 plus medium M comprise the interface. Although FIGS. 1B and 1C show bi-directional flow and interfaces on each side of the flow, certain implementations may only have information flow in one direction (or no information flow as described below) or may only have an interface object on one side. By way of example, and not limitation, terms such as application programming interface (API), entry point, method, function, subroutine, remote procedure call, and component object model (COM) interface, are encompassed within the definition of programming interface.

Aspects of such a programming interface may include the method whereby the first code segment transmits information (where "information" is used in its broadest sense and includes data, commands, requests, etc.) to the second code segment; the method whereby the second code segment receives the information; and the structure, sequence, syntax, organization, schema, timing and content of the information. In this regard, the underlying transport medium itself may be unimportant to the operation of the interface, whether the medium be wired or wireless, or a combination of both, as long as the information is transported in the manner defined by the interface. In certain situations, information may not be passed in one or both directions in the conventional sense, as the information transfer may be either via another mechanism (e.g. information placed in a buffer, file, etc. separate from information flow between the code segments) or non-existent, as when one code segment simply accesses functionality performed by a second code segment. Any or all of these aspects may be important in a given situation, e.g., depending on whether the code segments are part of a system in a loosely coupled or tightly coupled configuration, and so this list should be considered illustrative and non-limiting.

This notion of a programming interface is known to those skilled in the art and is clear from the foregoing detailed description of the invention. There are, however, other ways to implement a programming interface, and, unless expressly excluded, these too are intended to be encompassed by the claims set forth at the end of this specification. Such other ways may appear to be more sophisticated or complex than the simplistic view of FIGS. 1B and 1C, but they nonetheless perform a similar function to accomplish the same overall result. We will now briefly describe some illustrative alternative implementations of a programming interface.

A. Factoring

Figure 1D:
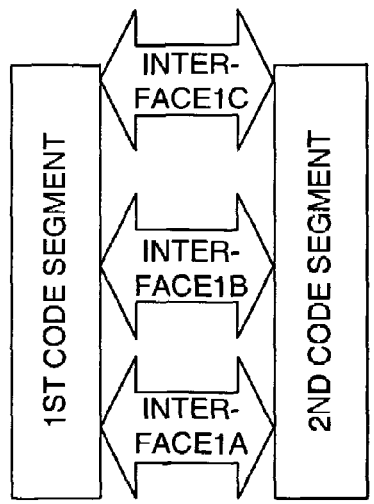

A communication from one code segment to another may be accomplished indirectly by breaking the communication into multiple discrete communications. This is depicted schematically in FIGS. 1D and 1E. As shown, some interfaces can be described in terms of divisible sets of functionality. Thus, the interface functionality of FIGS. 1B and 1C may be factored to achieve the same result, just as one may mathematically provide 24, or 2 times 2 times 3 times 2. Accordingly, as illustrated in FIG. 1D, the function provided by interface Interface1 may be subdivided to convert the communications of the interface into multiple interfaces Interface1A, Interface1B, Interface1C, etc. while achieving the same result. As illustrated in FIG. 1E, the function provided by interface I1 may be subdivided into multiple interfaces I1a, I1b, I1c, etc. while achieving the same result. Similarly, interface I2 of the second code segment which receives information from the first code segment may be factored into multiple interfaces I2a, I2b, I2c, etc. When factoring, the number of interfaces included with the 1st code segment need not match the number of interfaces included with the 2nd code segment. In either of the cases of FIGS. 1D and 1E, the functional spirit of interfaces Interface1 and I1 remain the same as with FIGS. 1B and 1C, respectively. The factoring of interfaces may also follow associative, commutative, and other mathematical properties such that the factoring may be difficult to recognize. For instance, ordering of operations may be unimportant, and consequently, a function carried out by an interface may be carried out well in advance of reaching the interface, by another piece of code or interface, or performed by a separate component of the system. Moreover, one of ordinary skill in the programming arts can appreciate that there are a variety of ways of making different function calls that achieve the same result.

B. Redefinition

Figure 1F:
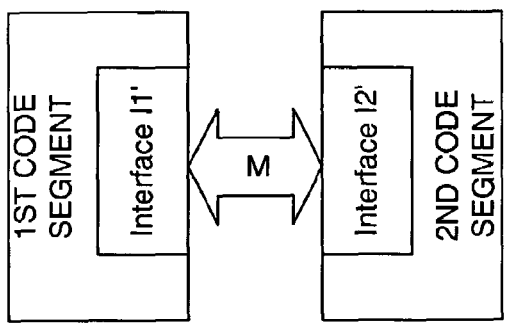
Figure 1G:
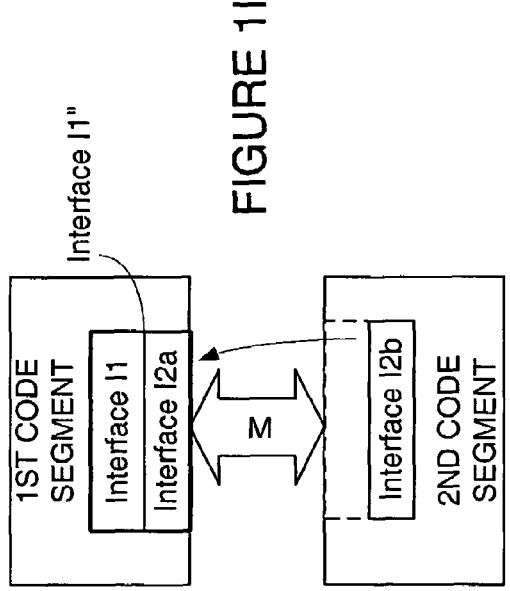

In some cases, it may be possible to ignore, add or redefine certain aspects (e.g., parameters) of a programming interface while still accomplishing the intended result. This is illustrated in FIGS. 1F and 1G. For example, assume interface Interface1 of FIG. 1B includes a function call Square (input, precision, output), a call that includes three parameters, input, precision and output, and which is issued from the 1st Code Segment to the 2nd Code Segment. If the middle parameter precision is of no concern in a given scenario, as shown in FIG. 1F, it could just as well be ignored or even replaced with a meaningless (in this situation) parameter. One may also add an additional parameter of no concern. In either event, the functionality of square can be achieved, so long as output is returned after input is squared by the second code segment. Precision may very well be a meaningful parameter to some downstream or other portion of the computing system; however, once it is recognized that precision is not necessary for the narrow purpose of calculating the square, it may be replaced or ignored. For example, instead of passing a valid precision value, a meaningless value such as a birth date could be passed without adversely affecting the result. Similarly, as shown in FIG. 1G, interface I1 is replaced by interface I1', redefined to ignore or add parameters to the interface. Interface I2 may similarly be redefined as interface I2', redefined to ignore unnecessary parameters, or parameters that may be processed elsewhere. The point here is that in some cases a programming interface may include aspects, such as parameters, which are not needed for some purpose, and so they may be ignored or redefined, or processed elsewhere for other purposes.

C. Inline Coding

Figure 1H:
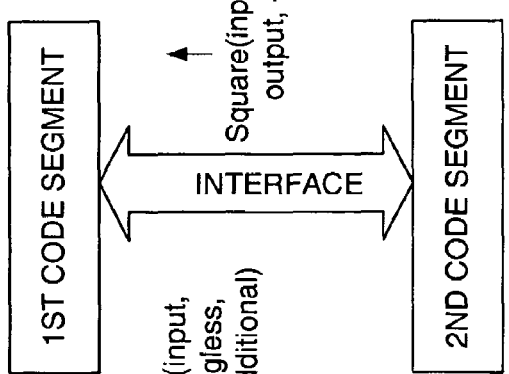
Figure 1I:
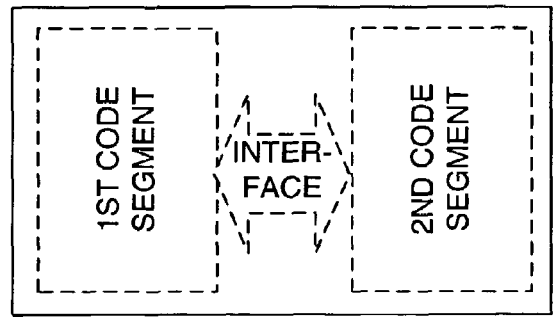

It may also be feasible to merge some or all of the functionality of two separate code modules such that the "interface" between them changes form. For example, the functionality of FIGS. 1B and 1C may be converted to the functionality of FIGS. 1H and 1I, respectively. In FIG. 1H, the previous 1st and 2nd Code Segments of FIG. 1B are merged into a module containing both of them. In this case, the code segments may still be communicating with each other but the interface may be adapted to a form which is more suitable to the single module. Thus, for example, formal Call and Return statements may no longer be necessary, but similar processing or response(s) pursuant to interface Interface1 may still be in effect. Similarly, shown in FIG. 1I, part (or all) of interface I2 from FIG. 1C may be written inline into interface I1 to form interface I1". As illustrated, interface I2 is divided into I2a and I2b, and interface portion I2a has been coded in-line with interface I1 to form interface I1". For a concrete example, consider that the interface I1 from FIG. 1C performs a function call square (input, output), which is received by interface I2, which after processing the value passed with input (to square it) by the second code segment, passes back the squared result with output. In such a case, the processing performed by the second code segment (squaring input) can be performed by the first code segment without a call to the interface.

D. Divorce

Figure 1K:
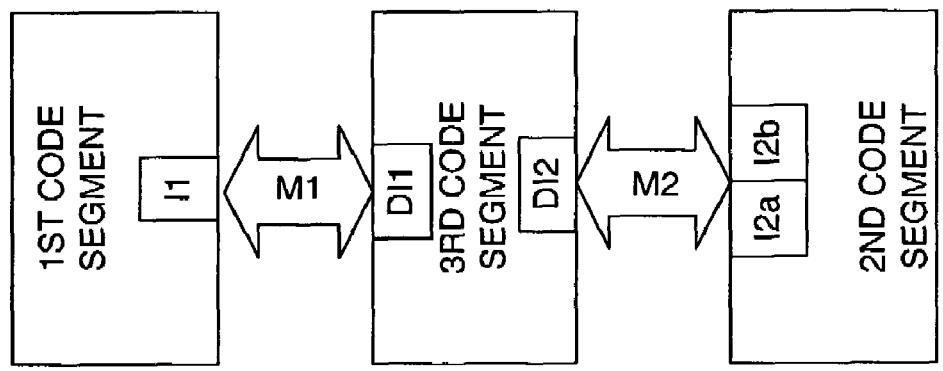
Figure 1J:
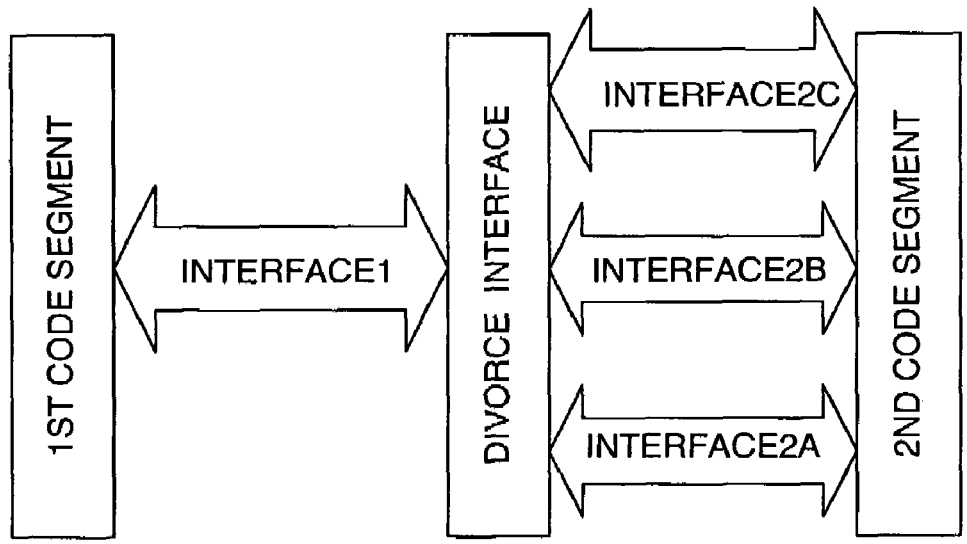

A communication from one code segment to another may be accomplished indirectly by breaking the communication into multiple discrete communications. This is depicted schematically in FIGS. 1J and 1K. As shown in FIG. 1J, one or more piece(s) of middleware (Divorce Interface(s), since they divorce functionality and/or interface functions from the original interface) are provided to convert the communications on the first interface, Interface1, to conform them to a different interface, in this case interfaces Interface2A, Interface2B and Interface2C. This might be done, e.g., where there is an installed base of applications designed to communicate with, say, an operating system in accordance with an Interface1 protocol, but then the operating system is changed to use a different interface, in this case interfaces Interface2A, Interface2B and Interface2C. The point is that the original interface used by the 2nd Code Segment is changed such that it is no longer compatible with the interface used by the 1st Code Segment, and so an intermediary is used to make the old and new interfaces compatible. Similarly, as shown in FIG. 1K, a third code segment can be introduced with divorce interface DI1 to receive the communications from interface I1 and with divorce interface DI2 to transmit the interface functionality to, for example, interfaces I2a and I2b, redesigned to work with DI2, but to provide the same functional result. Similarly, DI1 and DI2 may work together to translate the functionality of interfaces I1 and I2 of FIG. 1C to a new operating system, while providing the same or similar functional result.

E. Rewriting

Figure 1L:
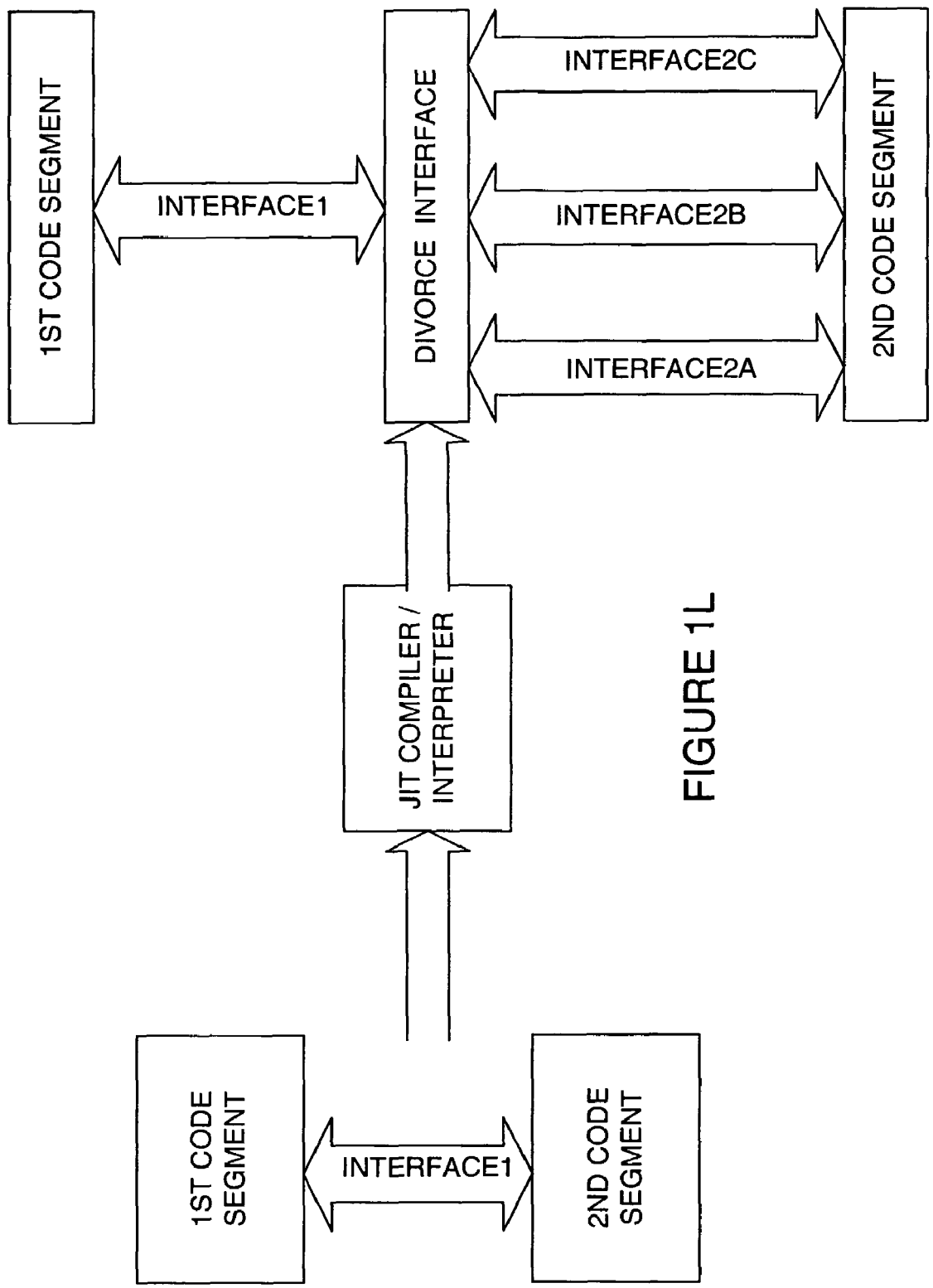
Figure 1M:
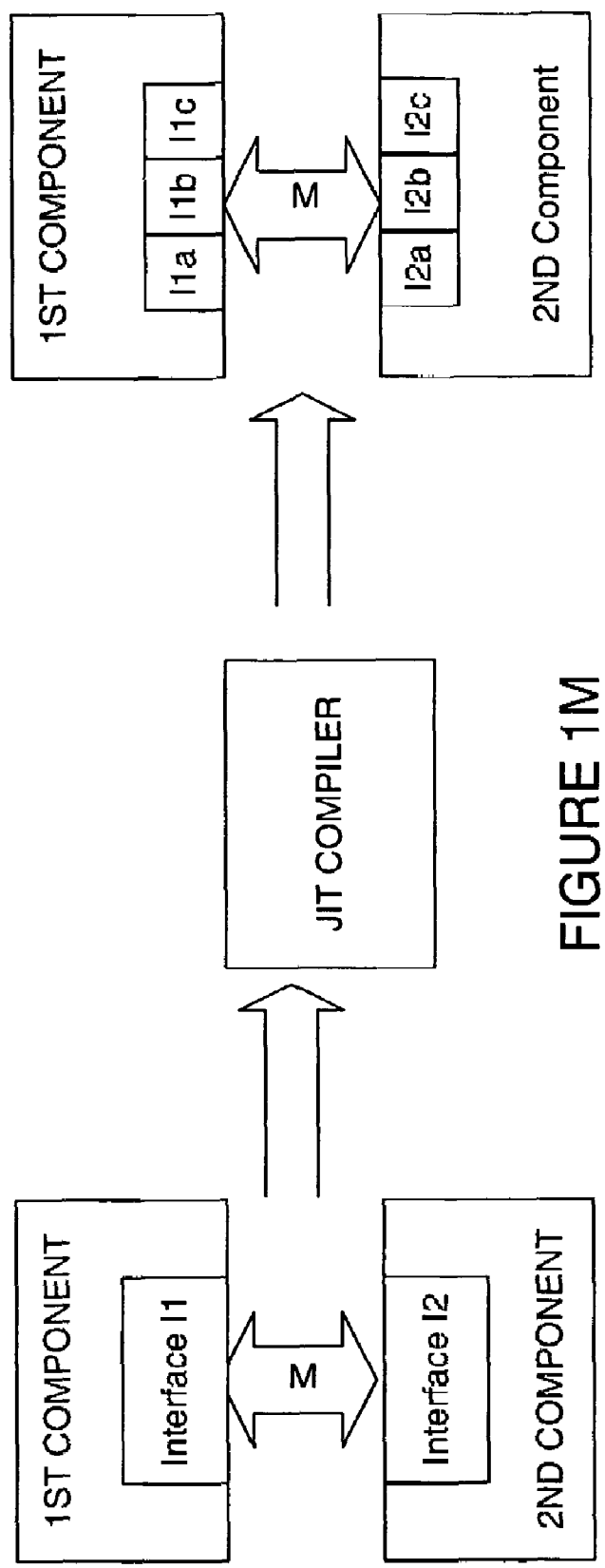

Yet another possible variant is to dynamically rewrite the code to replace the interface functionality with something else but which achieves the same overall result. For example, there may be a system in which a code segment presented in an intermediate language (e.g. Microsoft IL, Java ByteCode, etc.) is provided to a Just-in-Time (JIT) compiler or interpreter in an execution environment (such as that provided by the .Net framework, the Java runtime environment, or other similar runtime type environments). The JIT compiler may be written so as to dynamically convert the communications from the 1st Code Segment to the 2nd Code Segment, i.e., to conform them to a different interface as may be required by the 2nd Code Segment (either the original or a different 2nd Code Segment). This is depicted in FIGS. 1L and 1M. As can be seen in FIG. 1L, this approach is similar to the Divorce scenario described above. It might be done, e.g., where an installed base of applications are designed to communicate with an operating system in accordance with an Interface1 protocol, but then the operating system is changed to use a different interface. The JIT Compiler could be used to conform the communications on the fly from the installed-base applications to the new interface of the operating system. As depicted in FIG. 1M, this approach of dynamically rewriting the interface(s) may be applied to dynamically factor, or otherwise alter the interface(s) as well.

It is also noted that the above-described scenarios for achieving the same or similar result as an interface via alternative embodiments may also be combined in various ways, serially and/or in parallel, or with other intervening code.

Thus, the alternative embodiments presented above are not mutually exclusive and may be mixed, matched and combined to produce the same or equivalent scenarios to the generic scenarios presented in FIGS. 1B and 1C. It is also noted that, as with most programming constructs, there are other similar ways of achieving the same or similar functionality of an interface which may not be described herein, but nonetheless are represented by the spirit and scope of the invention, i.e., it is noted that it is at least partly the functionality represented by, and the advantageous results enabled by, an interface that underlie the value of an interface.

Figure 2:
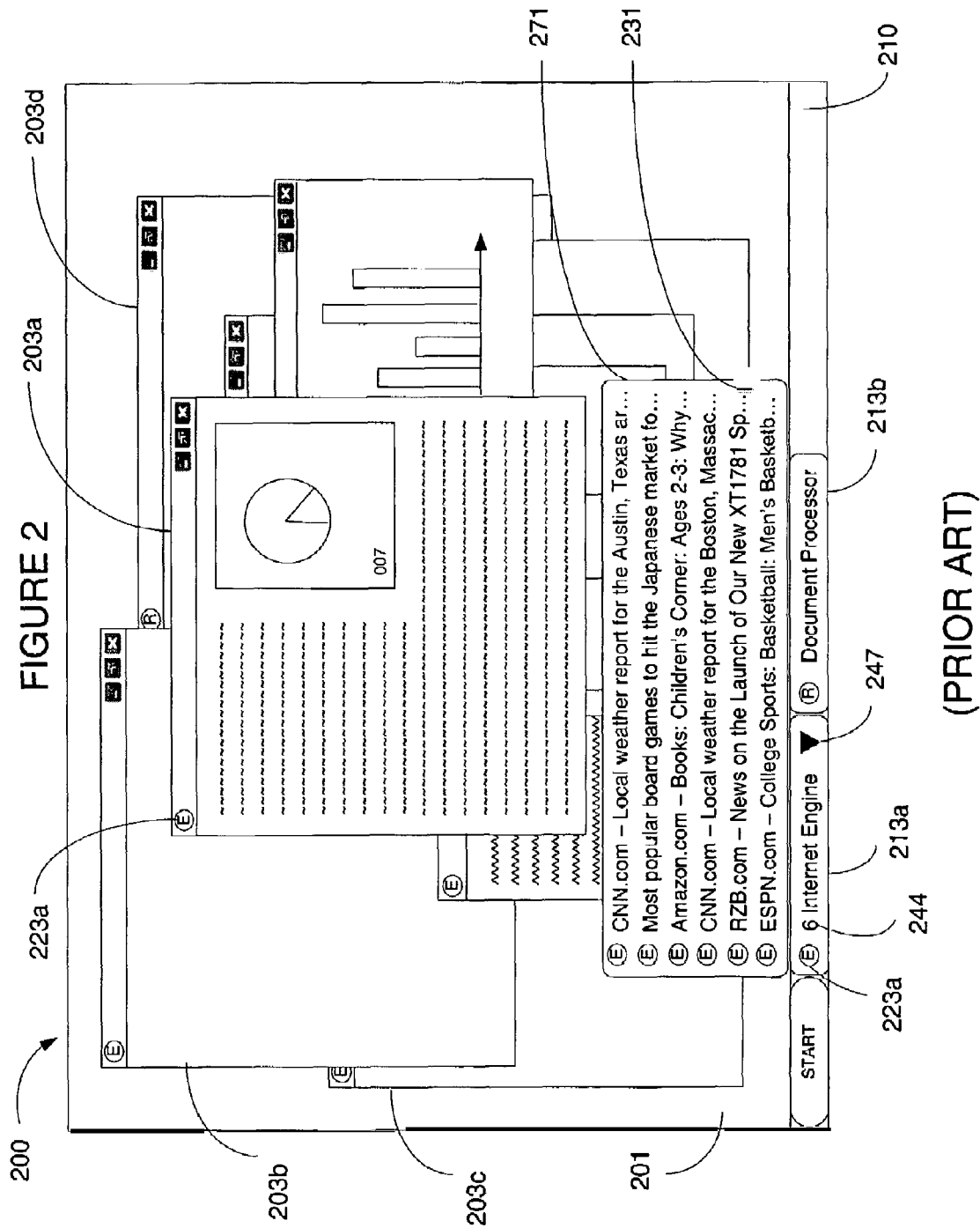
FIG. 2 illustrates a conventional window management scenario.

FIG. 2 illustrates a conventional window management scenario 200 in some graphical user interface systems. As shown, multiple open application windows are partially or completely obscured by other, larger windows that are positioned in front. Specifically, FIG. 2 shows a scenario 200 of multiple windows 203a-203d in a Z-order configuration in which application window 203a is higher in the Z-order than windows 203b, 203c, and 203d. Application windows 203a-203d are shown within a desktop space 201.

Desktop space 201 is an area of a display that allows for the display of windows corresponding to application programs. A predefined region 210, such as a taskbar, at the bottom indicates which application windows are currently in use including which windows may be visible or minimized. Predefined region 210 is a specific implementation of an on-screen window remote control used to list and enable manipulation of windows, such as activating, moving, hiding, and minimizing. Windows 203a, 203b, and 203c are represented by application tile 213a, and window 203d is represented by application window tile 213b. As shown in this example, the application program identified as "Internet Engine" currently has six windows open. The application windows 203a-203d and application tile 213 include an application icon identifier 223a to allow a user to identify the type of application running the application window. Although not referenced, application window tile 213b also may include an application icon identifier. The file names of the content of windows 203a-203d are shown in a pop-up menu 271 when a user moves a pointer 231 over an icon 247 for opening the pop-up menu. The file name may be generated by the application program operating the window and/or may be customizable by a user.

FIG. 2 illustrates an example of application windows that are in a glom. The conventional glom shown maintains an application window tile for each open application window tile under the application tile 213a. Application tile 213a identifies the common application between the application windows in the glom and does not represent any particular open application window. For example, as shown in FIG. 2, any application window opened under the "Internet Engine" application is contained within the glom. As shown, an application window tile counter 244, one type of visual indicator, is shown to allow a user to identify how many application windows are open currently under the "Internet Engine" application.

Windows 203a-203d are used by application programs to display content to a user. Each of windows 203a-203d is independent of and external to the other windows 203a-203d. As used herein, a first window is external to a second window when the first window is not contained within the second window and the second window is not contained within the first window. It should be understood that a first window is not contained in a second window if the two windows merely overlap.

Figure 3:
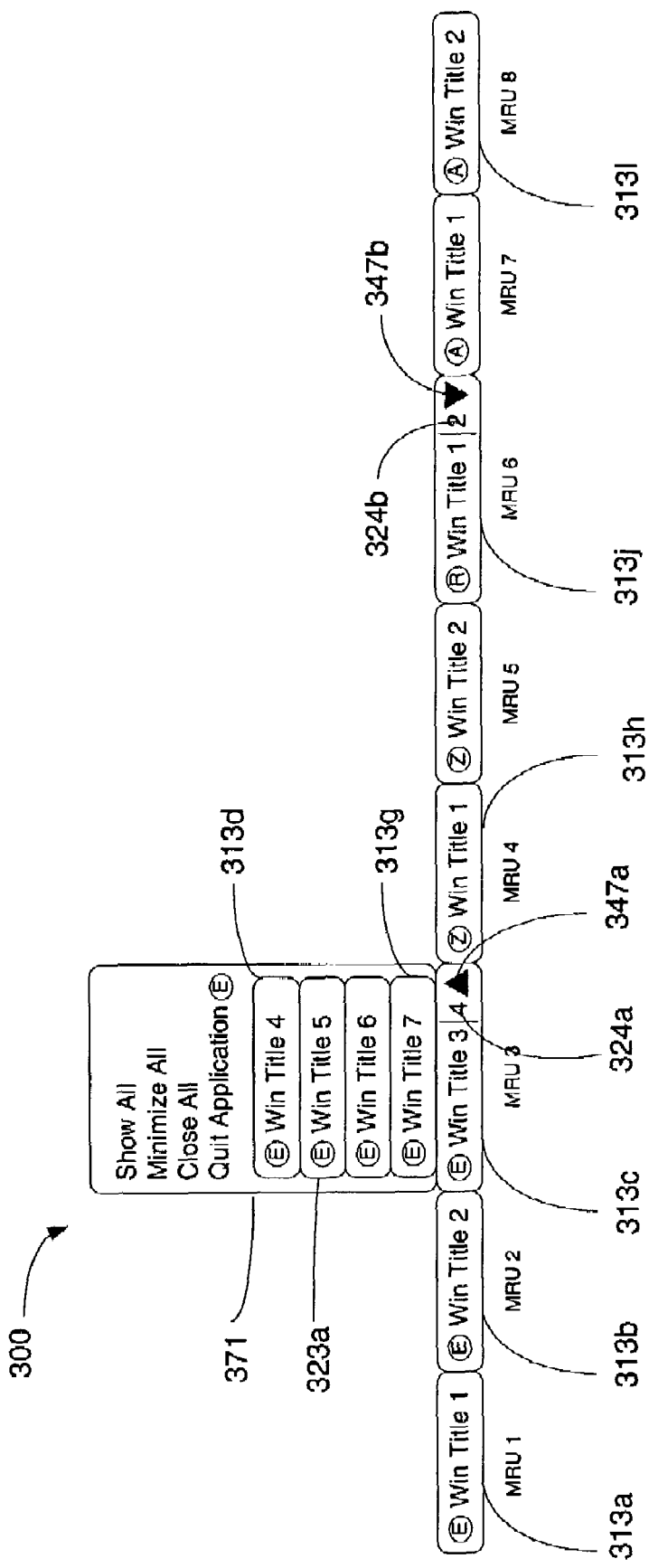
FIG. 3 illustrates an example of an application window representation system including a glom of application related application windows in accordance with at least one aspect of the present invention.

FIG. 3 illustrates an example of an application window representation system including a glom of application related application windows in accordance with at least one aspect of the present invention. In scenario 300, a predefined region, such as a taskbar region, includes a defined set of positions in which application window tiles 313a-313l are positioned. As shown, application window tile 313a occupies a most recently used position, application window tile 313b occupies a second most recently used position, and other application window tiles are shown occupying other positions. It should be understood by those skilled in the art that the arrangement of the positions of the application window tiles may be configured to be based on a different format than how recent the corresponding application windows were used.

Application window tile 313c is shown in a third most recently used position. A glom is shown in which five application window tiles are shown and tiles 313c, 313d, and 313g are specifically referenced. Application window tiles 313a-313g correspond to application windows that operate under the same application. Application icon identifier 323a indicates what application program the application window tile operates under. A glom menu 371 is displayed from a hidden state when a user moves a pointer 231 over an icon 347a for opening the glom menu 371. Glom menu 371 shows the application window tiles of the glom to allow a user to quickly access a particular application window. One aspect of present invention allows a user to directly access application window tile 313c without having to first open the glom of application window tiles. The conventional system in FIG. 2 shows that a user must first open an application tile 213a to see all the tiles within the glom. Under an aspect of the present invention, a user can directly access an application window associated with application window tile 313c without first opening the glom.

Application window tiles 313c and 313j differ from application window tiles 313a, 313b, 313h, and 313l because they are configured to include additional data to a user. A user can access the application window associated with application window tile 313c by clicking on the title portion of application icon identifier. Alternatively, the user can see the contents of the glom by accessing one of the icons 347a, 347b to expand the glom. In expanding the glom, a glom menu 371, or some other form of display of the glommed application window tiles, may be displayed. The user then may use the pointer 231 to access a desired application window by selecting the corresponding application window tile in the glom menu 371. The user can identify the number of application window tiles within the glom by the application window tile counter 324a. Application window tile counter 324a is one type of visual indicator to identify the number of application windows in a glom. As shown in FIG. 3, the application window tile counter shows a value of 4 to correlate to the four application window tiles within the glom. Application window tile counter 324b shows a value of 2 to correlate to the two application window tiles in a different glom. It should be understood by those skilled in the art that a number of different application window representations may be used and that an application window tile is but one example. The present invention is not so limited to any one type of representation of an application window.

In addition, FIG. 3 illustrates various actions that a user may take on a glom of application windows. For example, a user may move pointer 231 over the "Minimize All" operation in order to minimize all of the application windows in the glom to a predefined region, such as a taskbar. Still further, the method for glomming application windows may be configured to be a default operation by the system, configurable by a third party vendor, and/or configurable by a user. For example, a default program may arrange the application window tiles by how recent an application window was used. A third party vendor program may arrange the application window tiles according to similarity in content, while a user may configure her application windows according to some other method, such as by type of application. Again, it should be understood by those skilled in the art that the present invention is not so limited to the examples and illustrations provided.

Under conventional graphical user interface systems, a user can only switch to top-level windows. Some windows, however, are called child windows, because they are part of a group of windows inside some type of container. One example of such a container is a multiple document interface (MDI) application, where an application program, such as Microsoft® Visio, has a single top-level, or parent, window and multiple document, or child, windows open inside that one. An alternative to MDI is a Single Document Interface (SDI) in which each window contains one file, but there may be multiple windows open on a display screen to display several files at once. Microsoft® Word is an example of an SDI application program.

Figure 4:
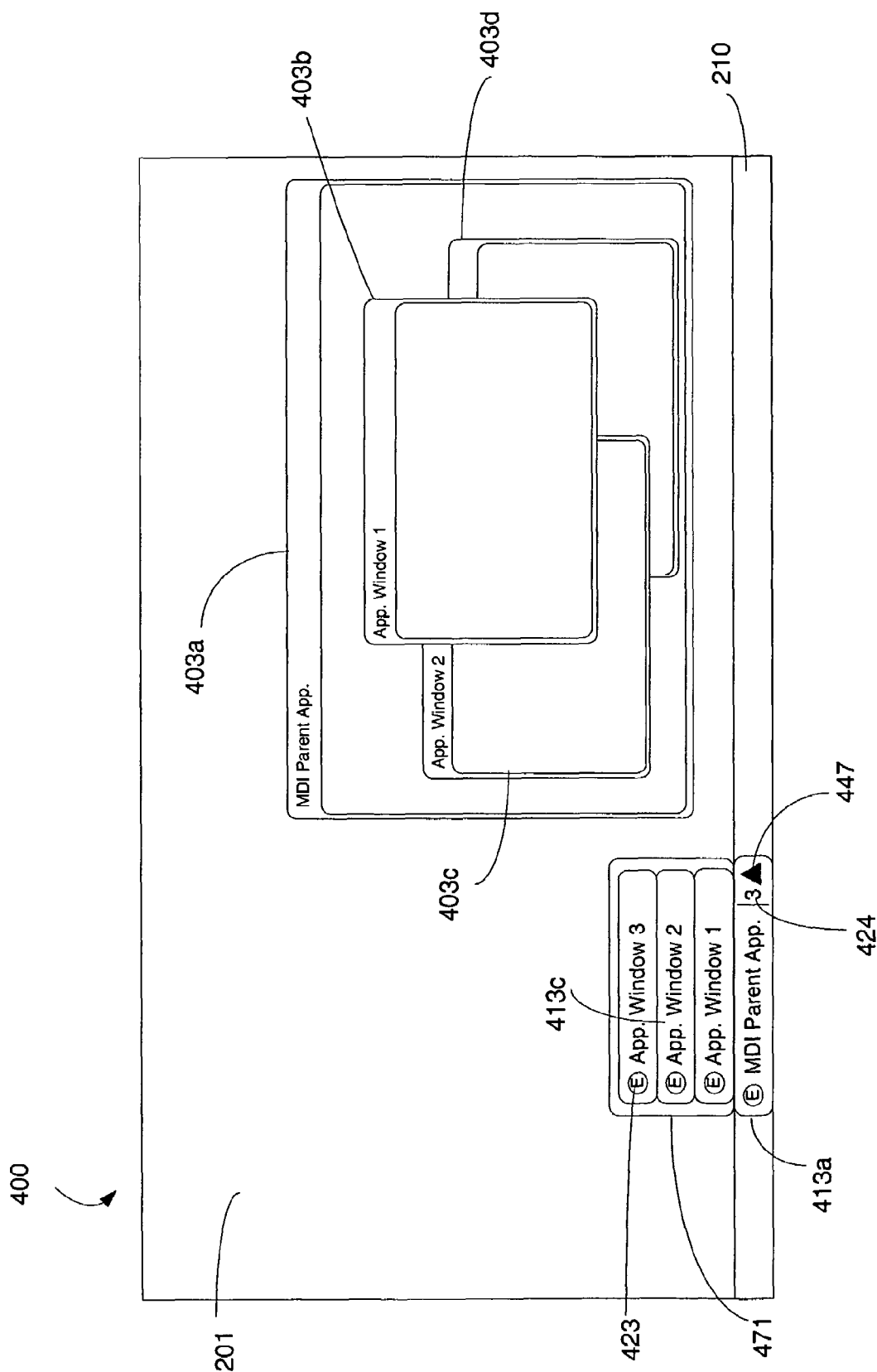
FIG. 4 illustrates another example of an application window representation system including a glom of multiple document interface (MDI) children application windows associated with an MDI parent application window in accordance with at least one aspect of the present invention.

FIG. 4 illustrates an example of an application window representation system including a glom of multiple document interface (MDI) children application windows associated with an MDI parent application window in accordance with at least one aspect of the present invention. In this scenario 400, a plurality of application windows 403a-403d is shown. Application window 403a is represented by application window tile 413a. Application window tile 413a is similar to application window tile 313c in that it includes an application window tile counter 424 and an icon 447. If a user hovers a pointer over icon 447, glom menu 471 is displayed to show the underlying application window icons within the glom.

Application window 403a is a MDI parent application window. Application windows 403b-403d are MDI child application windows associated with MDI parent application window 403a. As shown by one example, each of application windows 403b-403d is represented by an application window tile 413a in a glom in a predefined region 210 of a display screen. The user then may use the pointer 231 to access a desired application window by selecting the corresponding application window tile in the glom menu 471. Application icon identifier 423 indicates what application program the application window tile operates under. In this matter, the application icon identifier for each application window tile is identical as application windows 403b-403d are MDI child application windows associated with MDI parent application window 403a. The configuration of the glom of application window tiles may be a default system configuration, a configuration that is designed by a third party vendor and/or a configuration that a user can customize. As such, under at least one aspect of the present invention, MDI child application windows that are opened may be automatically configured to have their corresponding application window representation 413 within a glom of an MDI parent application window 403a.

It should be understood b those skilled in the art that aspects of the description of FIG. 3 may also be included within the description of FIG. 4. For example, a user may take various actions on a glom of MDI application windows in the same or similar manner as those described with reference to FIG. 3. A user may move pointer 231 over a "Minimize All" operation, similar to the one shown in FIG. 3, in order to minimize all of the MDI child application windows in the glom to a predefined region, such as a taskbar. Still further, the method for glomming application windows may be configured to be a default operation by the system, configurable by a third party vendor, and/or configurable by a user. For example, a default program may arrange the application window tiles by how recent an application window was used. A third party vendor program may arrange the application window tiles according to similarity in content, while a user may configure her application windows according to some other method, such as by type of application. Again, it should be understood by those skilled in the art that the present invention is not so limited to the examples and illustrations provided and that combinations of features from different examples may also be used together.

Figure 5A:
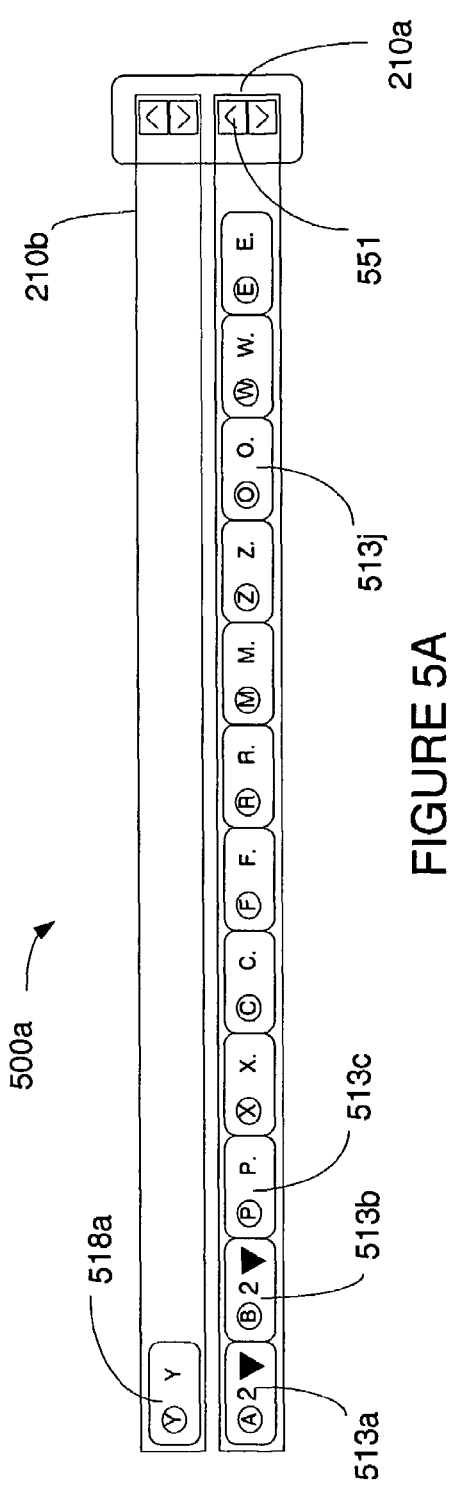
FIG. 5A illustrates a conventional taskbar region including an overflow added scroll bar to page through application window tiles.

FIG. 5A illustrates a conventional taskbar region including an overflow added scroll bar to page through application window tiles. In scenario 500a, when a number of application windows has been opened that exceeds a set of tile positions in a taskbar region 210a, additional tiles are positioned within a second taskbar region 210b. Scenario 500a illustrates how application tiles 513a and 513b are positioned in the set of tile positions in taskbar area 210a. Similarly, application window tiles 513c and 513j are also positioned within the taskbar region 210a. When all of the tile positions within the taskbar region 210a are occupied and a new application window is opened, an application window tile 518a corresponding to the new application window, is positioned within a second taskbar region 210b. A user must click on a scroll bar 551 to scroll between the various taskbars 210a and 210b. Once all of the tile positions in taskbar region 210b are occupied, a third taskbar region may be created. With all of the various taskbar regions to scroll through, it can be difficult to identify a desired tile within the myriad of application window tiles and application tiles.

Figure 5B:
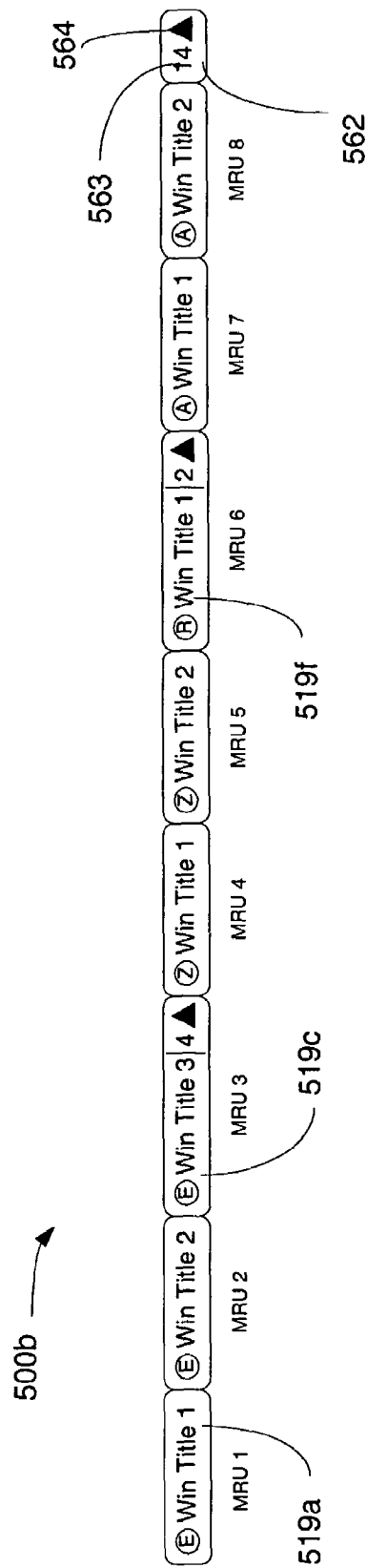
FIG. 5B illustrates an example of an application window representation system including an overflow menu in accordance with at least one aspect of the present invention.

FIG. 5B illustrates an example of an application window representation system including an overflow menu in accordance with at least one aspect of the present invention. In scenario 500b, when a number of application windows has been opened that exceeds a set of application window tile positions in a predefined region, such as a taskbar region, additional application window tiles are positioned within a glom in an overflow representation 562. Overflow representation 562 is similar to application window tile 519c in that it includes an application window tile counter 563 and an icon 564. If a user hovers a pointer over icon 564, a glom menu (not shown) is displayed to show the underlying application window icons within the overflow glom. In scenario 500b, a user does not need to scroll through various taskbar regions in order to find a particular application window tile. Instead, a user hovers a pointer 231 over the icon 564, displaying information related to the remaining 14 application window tiles not identified in the predefined region. As such, a user has one step access to all window application tiles.

Figure 6A:
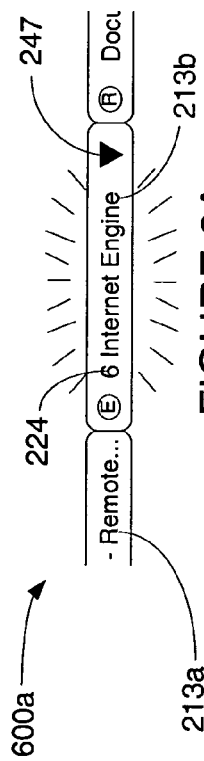
FIG. 6A illustrates a conventional taskbar region including an application notification.

FIG. 6A illustrates a conventional taskbar region including an application notification. In scenario 600a, application tile 213b is shown to include 8 application windows in the glom. The eight application windows are identified by the application window tile counter 224. Application tile 213b is shown in a state in which a notification is being made to a user. A notification is some signal to signify a condition/event that may be addressed by the user. For example, a notification may be a flashing of the tile 213b to indicate a new email message being received. A notification may cause a color change to the application tile 213b to attempt to attract the attention of the user. However, as the application windows are glommed, so are any notifications. A user cannot determine which application window corresponds to the notification without opening the glom menu. A user is required to open the glom menu in order to see the application window tile causing the notification and what type of attention is required by the user.

Figure 6B:
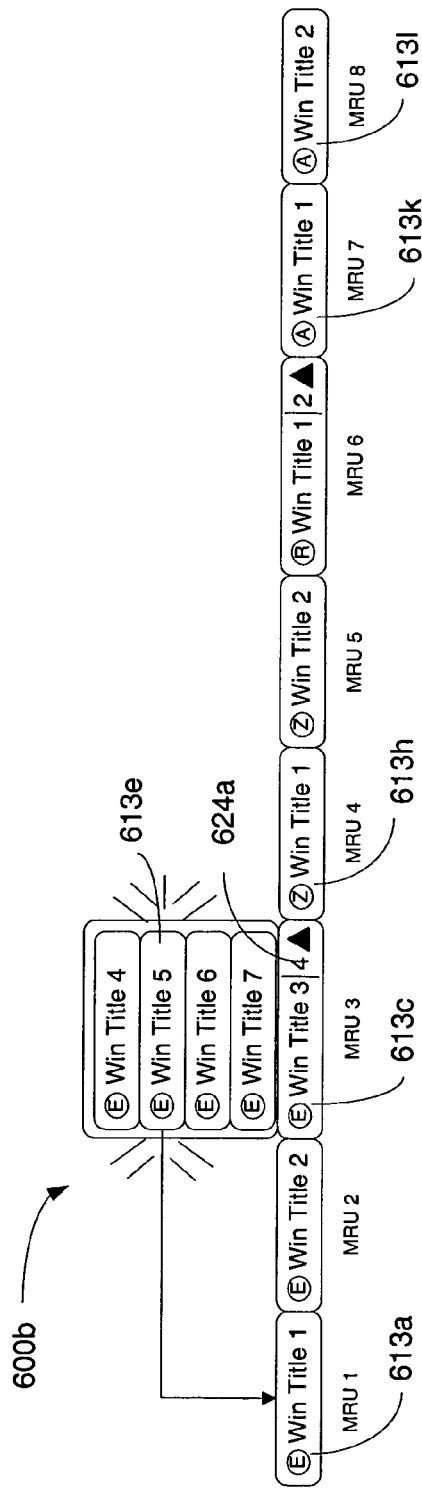
FIGS. 6B and 6C illustrate examples of an application window representation system including an application window specific notification in accordance with at least one aspect of the present invention.

FIG. 6B illustrates an example of an application window representation system including an application window specific notification in accordance with at least one aspect of the present invention. In scenario 600b, eight application window tile representations are shown to occupy positions within a set of positions in a predefined region. In this example, there are shown eight positions where a most recently used position is at a left side of the predefined region. Application window tile 613a is shown positioned within the most recently used position, and application window tile 613l is shown positioned within the eighth and last position. It should be understood that this is but one illustrative example of a configuration of application window tile representations and that other manners for displaying the same may be used.

Application window tile 613e is within a glom menu at the third position in the predefined region. Application window tile 613c includes an application window tile counter 624a indicating that the glom menu includes four application window tiles. Application window tile 613e is shown in a state in which a notification is being made to a user. As shown in this example, the glom menu may automatically be displayed when a notification for an application window within the glom is received. As such, a user may be notified by a flashing application window tile 613e in the glom menu, as shown in FIG. 6B, when a notification for that application window is received.

Figure 6C:
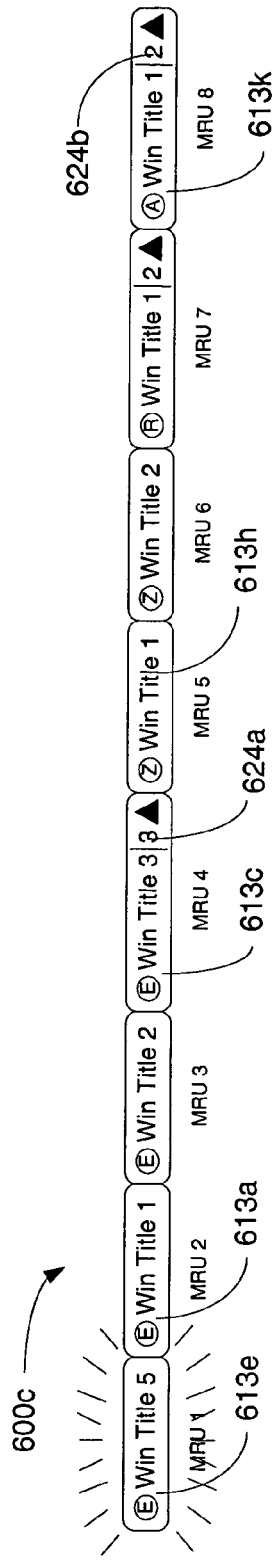

Application window 6C illustrates another example of an application window representation system including an application window specific notification in accordance with at least one aspect of the present invention. In scenario 600c, application window 613e, which has received a notification, is moved to occupy one of the eight positions in the predefined region that are visible to a user. In this example, application window 613e has been pulled out of the glom and inserted into the most recently used position in the predefined region. In response, because an application window tile has been removed from the glom at the third most recently used position, a number of changes to the arrangement of the tiles in the predefined region may occur. For example, as shown in FIG. 6C, each of the application window tiles in the predefined region has been shifted down (to the right) one position. For example, application window tile 613a in the most recently used position in FIG. 6B is now shown in the second most recently used position in FIG. 6C. Application window 613e, which received the notification, has been moved to the most recently used position. Further, because application window tile 613e was removed from the glom, the application window tile counter 624a is decremented by one to indicate that only three other application windows are glommed in the corresponding glom menu. Still further, a glom may be established because of the repositioning of application window tile 613e. In FIG. 6C, application window tile 613k has been converted to an application window tile that includes and application window tile counter 624b. Although not shown, application window tile 613l is positioned within a glom at the eighth and last position within the set in the predefined region.

It should be understood by those skilled in the art that aspects of the present invention are not limited to the number of application windows and/or gloms shown in the Figures and that any number of different gloms of application windows may be created. Further, it should be understood that in accordance with various aspects of the present invention, one or more windows may be added or removed from a glom. Still further, it should be understood that the illustrative examples for repositioning an application window tile representation from a glom upon receipt of a notification do not limit the present invention. Other methods may be used to reposition an application window tile representation. For example, an application window tile representation may be removed from a glom and repositioning it in a different position than those shown in the Figures, such as to the right of the corresponding glom.

Figure 7:
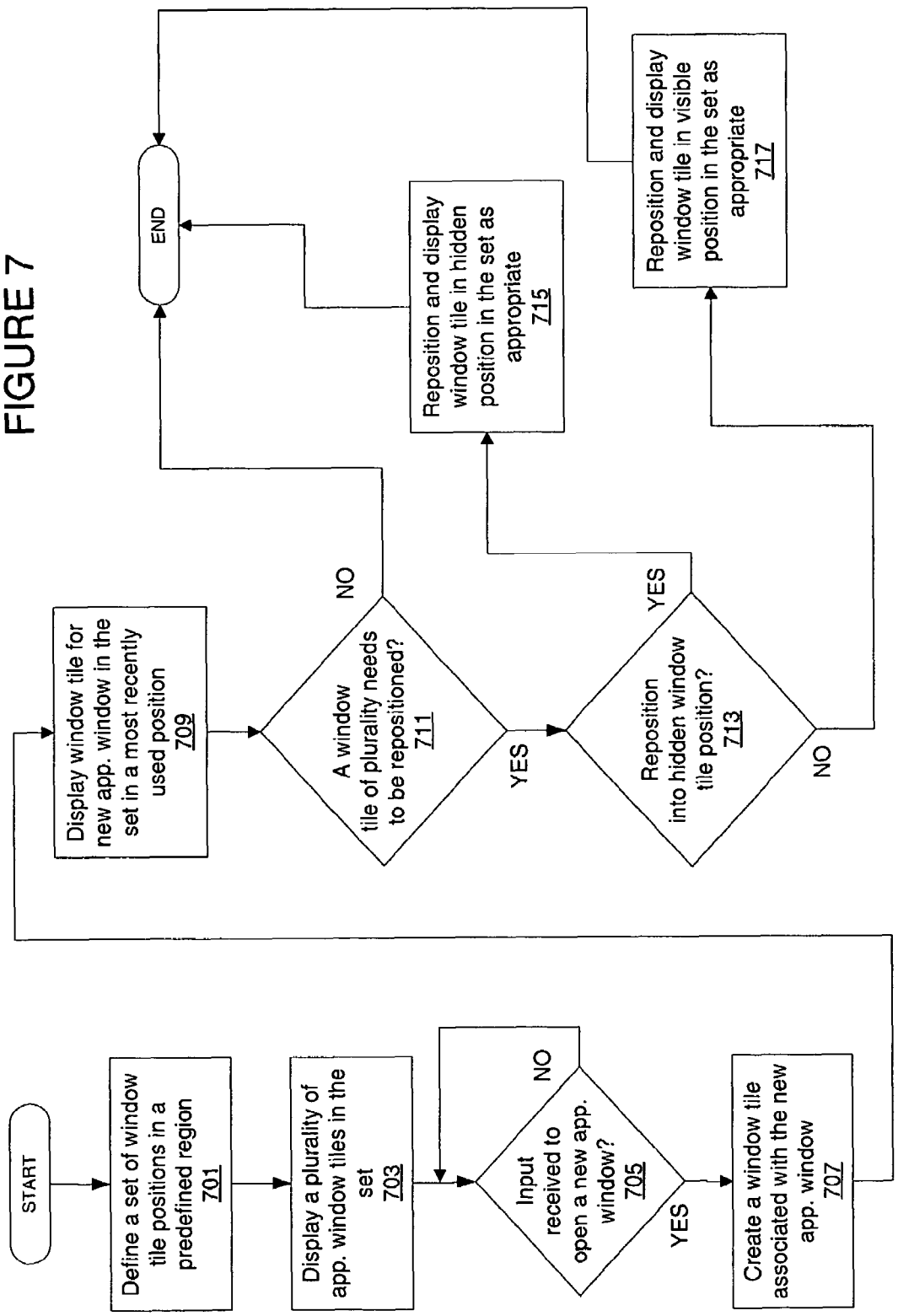
FIG. 7 is a flowchart of an illustrative example of a method for positioning application window representations in accordance with at least one aspect of the present invention.

FIG. 7 is a flowchart of an illustrative example of a method for positioning application window representations in accordance with at least one aspect of the present invention. The process starts at step 701 where a set of application window tile positions are defined within a predefined region on a display screen. The predefined region may be a taskbar region along a bottom of the display screen. For example, the set of application window tile positions may be eight positions that are always visible to a user if the predefined region is always visible. The process proceeds to step 703 where a plurality of application window representations are displayed in the set of positions. A tile is one type of representation. At step 705, a determination is made as to whether an input has been received to open a new application window. If not, the process continues to wait until an input is received. When an input is received in step 705, the process moves to step 707 where an application window tile associated with the new application window is created. At step 709, the newly created application window tile is displayed within the set in the most recently used position. Again, it should be understood by those skilled in the art that the newly created application window tile may be positioned in accordance with a different scheme that is a default scheme, a third party vendor scheme, and/or a user configured scheme.

Proceeding to step 711, a determination is made as to whether an application window tile of the plurality needs to be repositioned in response to the addition of the new application window tile. If not, the process ends. If so, another determination is made at step 713 as to whether the window tile from step 711 needs to be repositioned into a hidden application window tile position. A hidden application window tile position may be located within a glom menu or an overflow menu as described above. A hidden application window tile is visible to a user when the glom menu or overflow menu is accessed. If the tile needs to be repositioned into a hidden position, at step 715, the application window tile is repositioned and displayed, as appropriate, in the set. If the tile does not need to be repositioned into a hidden position in step 713, the process moves to step 717 where the application window tile is repositioned and displayed in a visible position in the set as appropriate.

Figure 8:
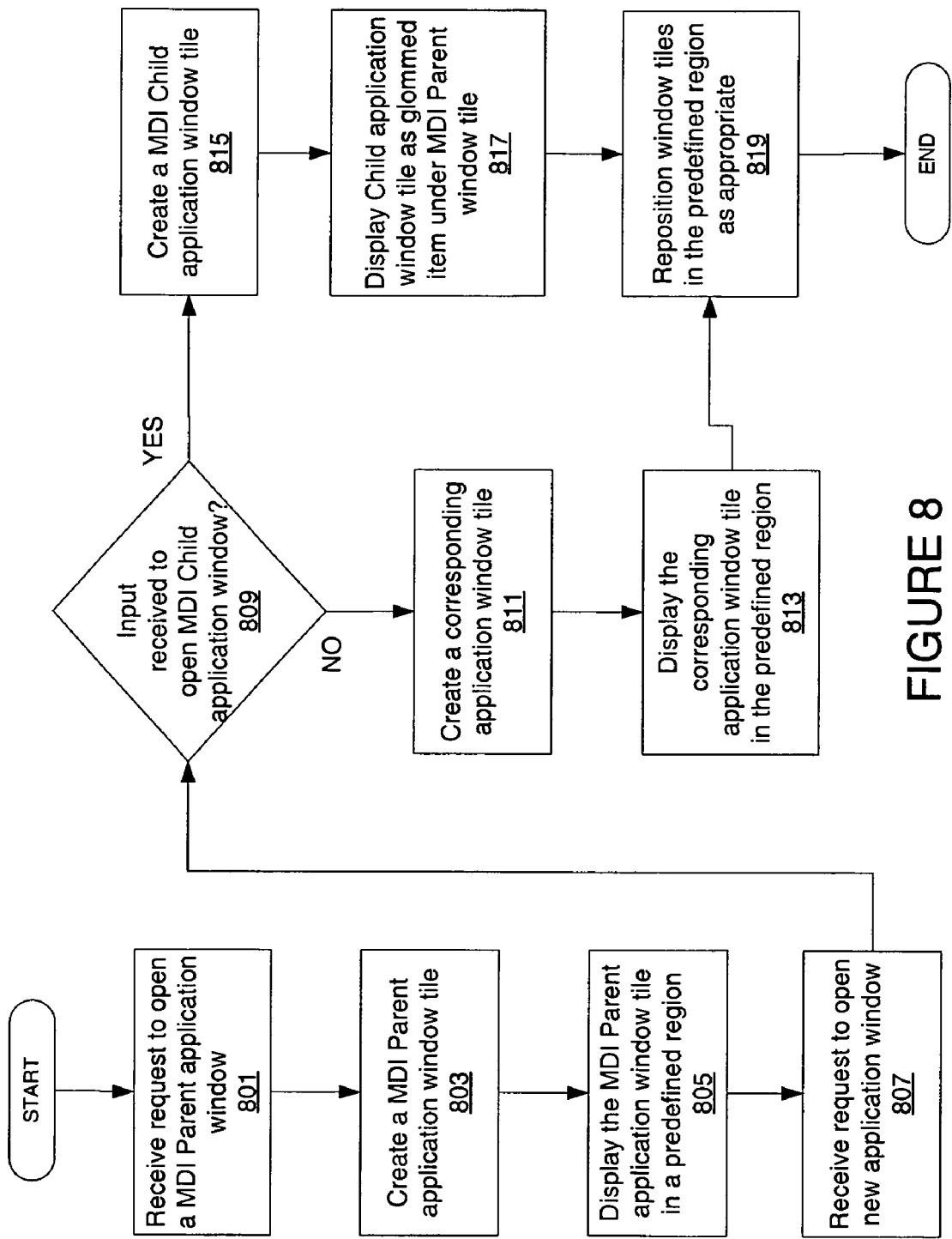
FIG. 8 is a flowchart of another illustrative example of a method for positioning application window representations in accordance with at least one aspect of the present invention.

FIG. 8 is a flowchart of another illustrative example of a method for positioning application window representations in accordance with at least one aspect of the present invention. At step 801, a request is received to open a multiple document interface (MDI) parent application window. Such a situation may occur when a user launches an application such as Microsoft® Visio. At step 803, a MDI parent application window tile is created and the MDI parent application window tile is displayed within a predefined region at step 805. Moving to step 807, a request is received to open a new application window. At step 809, a determination is made as to whether an input has been received to open an MDI child application window. If no, the process moves to step 811 where a corresponding application window for the new application window is created and, at step 813, the application window tile is displayed in the predefined region. Application window tiles are repositioned as necessary within the predefined area at step 819 before the process ends. For example, the new application window tile may occupy a most recently used position in the predefined region. Thus, the MDI parent application window tile may be repositioned to another position.

If the input received is a request to open a MDI child application window in step 809, the process proceeds to step 815 where a MDI child application window tile is created. At step 817, the MDI child application window tile is displayed as a glommed item under the MDI parent application window tile. Proceeding to step 819, application window tiles are repositioned within the predefined region as appropriate. For example, the MDI parent application window may be repositioned to a most recently used position in the predefined region.

Figure 9:
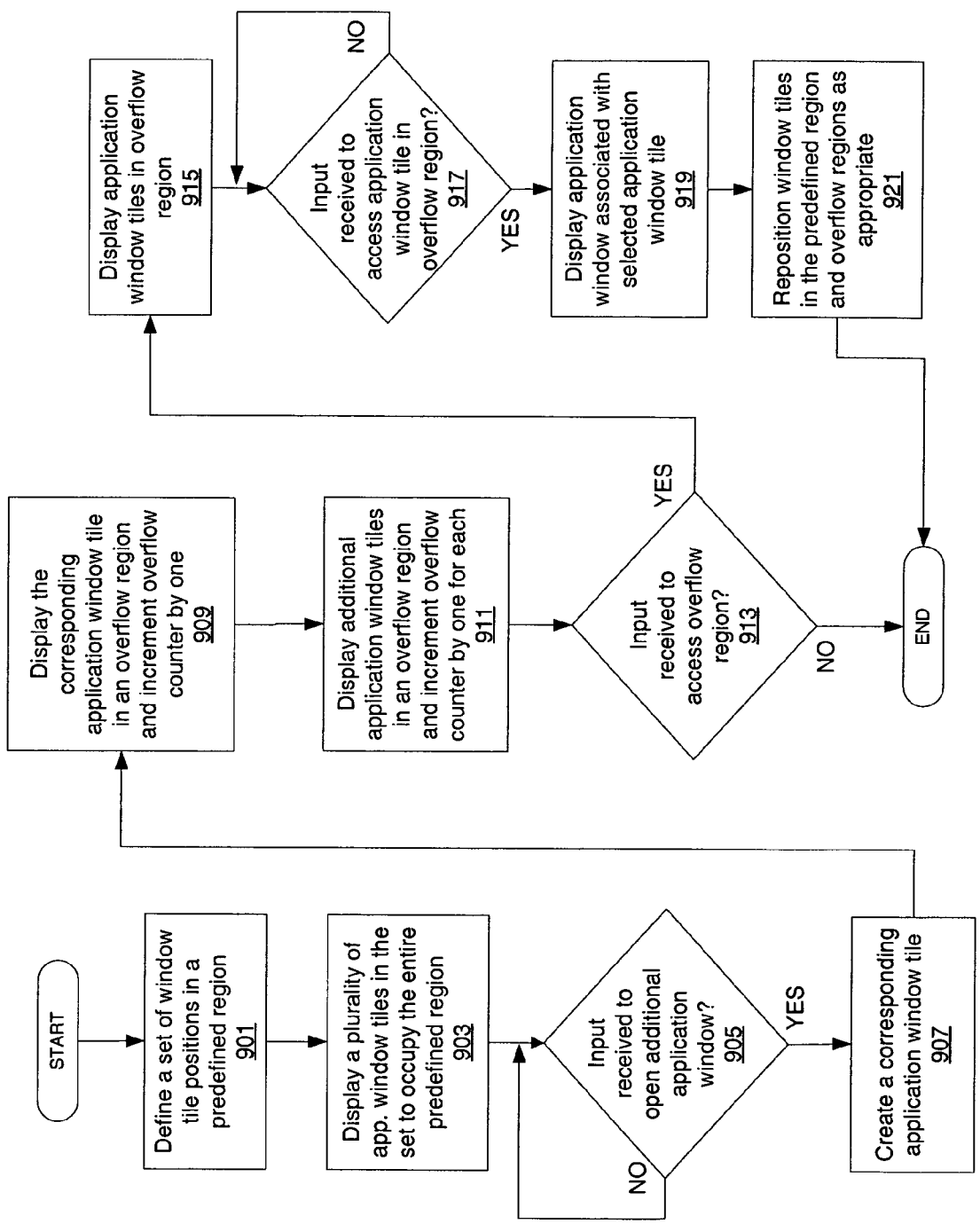
FIG. 9 is a flowchart of another illustrative example of a method for positioning application window representations in accordance with at least one aspect of the present invention.

FIG. 9 is a flowchart of another illustrative example of a method for positioning application window representations in accordance with at least one aspect of the present invention. The process starts at step 901 where a set of application window tile positions are defined within a predefined region on a display screen. The predefined region may be a taskbar region along a bottom of the display screen. For example, the set of application window tile positions may be eight positions that are always visible to a user if the predefined region is always visible. The process proceeds to step 903 where a plurality of application window representations are displayed to occupy up to all visible positions in the set within the predefined region. A tile is one type of representation. At step 905, a determination is made as to whether an input has been received to open an additional application window. If not, the process continues to wait until an input is received. When an input is received in step 905, the process moves to step 907 where an application window tile associated with the new application window is created. At step 909, the newly created application window tile is displayed in an overflow region and an overflow counter is incremented by one. The overflow region may be a menu. Again, it should be understood by those skilled in the art that the newly created application window tile may be positioned in accordance with a different scheme that is a default scheme, a third party vendor scheme, and/or a user configured scheme and a different application window tile then may be repositioned to the overflow region.

At step 911, any additional application window tiles are created and displayed in the overflow region and the counter is incremented by one for each. Moving to step 913, a determination is made as to whether an input has been received to access the overflow region. If not, the process ends. If so, the process moves to step 915 where the application window tiles within the overflow region are displayed. At step 917, a determination is made as to whether an input has been received to access an application window tile in the overflow region. If not, the process waits until an input access is received. When an input to access an application window tile in the overflow region is received at step 917, the process proceeds to step 919 where the application window associated with the selected application window tile is displayed at the top of the Z-order in a desktop space on the display screen. The process proceeds to step 921 where application window tiles are repositioned within the predefined region and the overflow region as appropriate.

Figure 10:
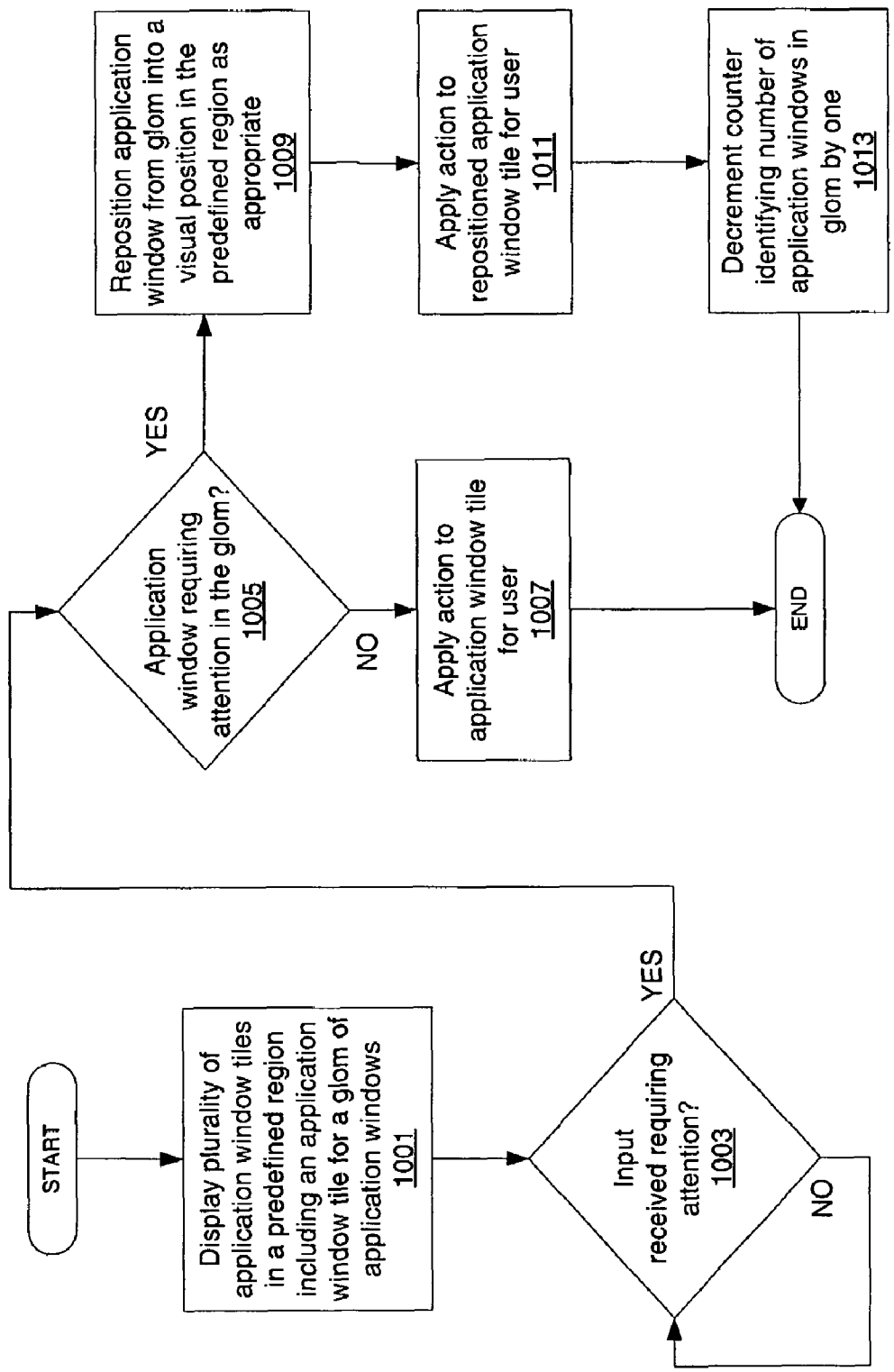
FIG. 10 is a flowchart of another illustrative example of a method for displaying a notification corresponding to an application window representation in accordance with at least one aspect of the present invention.

FIG. 10 is a flowchart of another illustrative example of a method for displaying a notification corresponding to an application window representation in accordance with at least one aspect of the present invention. The process starts at step 1001 where a plurality of application window tiles is displayed in a predefined region including an application window tile for a glom of application windows. At step 1003, a determination is made as to whether an input has been received requiring attention. For example, such a situation may occur when a notification alert is received. If not, the process waits until the input is received. If yes, the process moves to step 1005 where a determination is made as to whether the application window needing attention is within a glom. If not, the process proceeds to step 1007 where an action is applied to the application window tile for the user and the process ends. If the application window is within a glom at step 1005, the process moves to step 1009 where the application window tile is repositioned from a glom menu for the glom into a visible position within the predefined region as appropriate. For example, the application window may be repositioned to a most recently used position. At step 1011, an action is applied to the application window tile for the user. Such an action may be to cause the application window tile to flash and/or change color. At step 1013, a counter identifying the number of application window tiles in the glom is decremented by one since the glommed application window tile from step 1005 was repositioned to a visible position.

Another embodiment is programmatically controlling the positioning of application windows directly into a glom. For example, one or more applications, such as Microsoft® Office, may share the concept of a project consisting of several documents. These documents may be opened simultaneously into a glom or automatically added to a glom as new documents in the project are opened by a user.

With respect to an application programming interface (API), various aspects of the present invention may be performed by an API. For example, public APIs may interface with an operating system to allow the operating system to provide the various features of the present invention. In one embodiment, a software architecture for processing data representative of glommed application window tiles may include a component configured to position a first application window tile and a second application window tile into a glom and an application program interface to access the component. An API may receive a request to glom two application window tiles, access the necessary function(s) to perform the operation, and then send the results back to an operating system. The operating system may use the data provided from the API to perform the various features of the present invention. APIs that let application programs take advantage of application window tile gloms includes positioning and repositioning application window tiles programmatically.

While illustrative systems and methods as described herein embodying various aspects of the present invention are shown, it will be understood by those skilled in the art, that the invention is not limited to these embodiments. Modifications may be made by those skilled in the art, particularly in light of the foregoing teachings. For example, each of the elements of the aforementioned embodiments may be utilized alone or in combination or subcombination with elements of the other embodiments. It will also be appreciated and understood that modifications may be made without departing from the true spirit and scope of the present invention. The description is thus to be regarded as illustrative instead of restrictive on the present invention.

We claim:

1. One or more computer-readable storage media having computer-executable instructions embodied thereon for performing a method for managing a plurality of application window representations, the method comprising steps of:
    defining a set of application window representation positions in a predefined region of a display;
    displaying a first application window representation at one of the set of application window representation positions, wherein the first application window representation is associated with a first application window corresponding to a first application;
    receiving an input to open a second application window;
    determining that a second application window representation associated with the second application window should be located at a hidden application window representation position within a glom associated with the first application window representation, wherein the hidden application window representation is not within the set;
    displaying the second application window;
    responsive to displaying the second application window, maintaining a second application window representation associated with the second application window at a hidden application window representation position within a glom associated with the first application window representation;
    receiving a first user input to the first application window representation; and
    responsive to the first user input, providing access to the first application window without displaying the second application window representation.

2. The method of claim 1, wherein the second application window corresponds to a second application that is related to the first application.

3. The method of claim 2, wherein the first application comprises a first document related to a project and the second application comprises a second document related to the project.

4. The method of claim 2, wherein the first application window comprises a multiple document interface parent application window and the second application window comprises a multiple document interface child application window.

5. The method of claim 1, further comprising displaying a glom menu comprising at least the second application window representation when an input is received to display the glom menu.

6. The method of claim 1, further comprising displaying a glom menu comprising at least the second application window representation upon receiving a notification of an occurrence of an event corresponding to the second application window, wherein the event comprises a change in state or condition associated with a second application corresponding to the second application window.

7. One or more computer-readable storage media having computer-executable instructions embodied thereon for performing a method for displaying a notification associated with an application, the method comprising steps of:
    displaying a first application window representation at a first application window representation position within a predefined region of a display, wherein the first application window representation is associated with a first application window;
    maintaining a second application window representation at a hidden application window representation position within a glom associated with the first application window representation, wherein the second application window representation is associated with a second application window;
    receiving a notification of an occurrence of an event corresponding to the second application window, wherein the event comprises a change in state or condition associated with a second application corresponding to the second application window;
    in response to receiving the notification, repositioning the second application window representation from the hidden application window representation position to a second application window representation position within the predefined region of the display; and displaying the second application window representation at the second application window representation position.

8. The method of claim 7, wherein the first application window representation includes a visual indication comprising a counter representing a number of application window representations maintained within the glom.

9. The method of claim 8, further comprising decrementing the counter by one.

10. The method of claim 7, wherein the second application window representation includes a visual indication that a notification has been received.

11. The method of claim 10, wherein the visual indication comprises a change in appearance of the second application window representation.

12. The method of claim 7, wherein the second application window representation position is defined to display an application window representation associated with a most recently used application window.

13. One or more computer-readable storage media having computer-executable instructions embodied thereon for performing a method for managing a plurality of application window representations, the method comprising:

defining an ordered set of application window representation positions in a predefined region of a display, wherein the ordered set is configured to display application window representations at predetermined positions according to how recently associated application windows were used;

defining an overflow representation position in the predefined region;

displaying an application window representation at each of the set of application window representation positions, wherein each application window representation is associated with an open application window, and further wherein a first application window representation associated with a most recently used application window is displayed at a first position of the set;

receiving a user input to open a first application window;

repositioning the first application window representation from the first position to a second position within the set;

repositioning a second application window representation from a third position within the set to a hidden application window representation position within a glom associated with the overflow representation, wherein the hidden application window representation position is not within the set; and displaying a third application window representation at the first position, wherein the third application window representation is associated with the first application window.

14. The method of claim 13, wherein the second application window representation is associated with a least recently used application window.

15. The method of claim 13, wherein the overflow representation includes a visual indication comprising a counter representing a number of application window representations maintained within the glom.

16. The method of claim 15, further comprising incrementing the counter by one.

17. The method of claim 13, further comprising displaying an overflow glom menu comprising at least the second application window representation when an input is received to display the glom menu.

18. The method of claim 13, further comprising displaying a glom menu comprising at least the second application window representation position in response to receiving a notification of an occurrence of an event corresponding to a second application window that is associated with the second application window representation.

19. The method of claim 13, further comprising repositioning the second application window representation from the hidden application window representation position to the first position in response to receiving a notification of an occurrence of an event corresponding to a second application window that is associated with the second application window representation.

20. The method of claim 19, further comprising decrementing the counter by one.

* * * * *